US008077240B2

(12) United States Patent
Ellis-Monaghan et al.

(10) Patent No.: US 8,077,240 B2
(45) Date of Patent: Dec. 13, 2011

(54) METHODS FOR ENHANCING QUALITY OF PIXEL SENSOR IMAGE FRAMES FOR GLOBAL SHUTTER IMAGING

(75) Inventors: John J. Ellis-Monaghan, Grand Isle, VT (US); Mark D. Jaffe, Shelburne, VT (US)

(73) Assignee: Inernational Business Machines Corporation, Armonk, NY (US)

( * ) Notice: Subject to any disclaimer, the term of this patent is extended or adjusted under 35 U.S.C. 154(b) by 698 days.

(21) Appl. No.: 12/107,825

(22) Filed: Apr. 23, 2008

(65) Prior Publication Data
US 2009/0268063 A1 Oct. 29, 2009

(51) Int. Cl.
H04N 3/14 (2006.01)
H04N 5/335 (2011.01)
H04N 9/64 (2006.01)
H01L 31/062 (2006.01)
H01L 31/113 (2006.01)
(52) U.S. Cl. .................. 348/308; 348/243; 257/292
(58) Field of Classification Search .............. 348/241, 348/243, 308; 257/292, 294
See application file for complete search history.

(56) References Cited

U.S. PATENT DOCUMENTS

| | | |
|---|---|---|
| 2006/0202036 A1 | 9/2006 | Wang et al. |
| 2007/0153109 A1 | 7/2007 | Lule |
| 2007/0176213 A1 | 8/2007 | Oda |
| 2007/0222879 A1 | 9/2007 | Glenn et al. |
| 2007/0252184 A1 | 11/2007 | Ohkawa |
| 2008/0006764 A1* | 1/2008 | Boemler ............... 250/208.1 |
| 2008/0111159 A1* | 5/2008 | Gambino et al. ........... 257/225 |
| 2009/0060337 A1* | 3/2009 | Novikov .................. 382/181 |
| 2009/0127436 A1* | 5/2009 | Johnson .................. 250/208.1 |
| 2009/0160979 A1* | 6/2009 | Xu et al. ................. 348/243 |
| 2009/0242948 A1* | 10/2009 | Barrett et al. ............. 257/291 |

* cited by examiner

*Primary Examiner* — Kelly L Jerabek
(74) *Attorney, Agent, or Firm* — Scully, Scott, Murphy & Presser, P.C.; Anthony J. Canale

(57) ABSTRACT

The image quality of an image frame from a CMOS image sensor array operated in global shutter mode may be enhanced by dispersing or randomizing the noise introduced by leakage currents from floating drains among the rows of the image frame. Further, the image quality may be improved by accounting for time dependent changes in the output of dark pixels in dark pixel rows or dark pixel columns. In addition, voltage and time dependent changes in the output of dark pixels may also be measured to provide an accurate estimate of the noise introduced to the charge held in the floating drains. Such methods may be employed individually or in combination to improve the quality of the image.

8 Claims, 8 Drawing Sheets

METHODS FOR ENHANCING QUALITY OF PIXEL SENSOR IMAGE FRAMES FOR GLOBAL SHUTTER IMAGING

FIELD OF THE INVENTION

The present invention relates to a semiconductor structure, and particularly to methods for enhancing the quality of image frames from a pixel sensor array.

BACKGROUND OF THE INVENTION

A pixel sensor comprises an array of pixel sensor cells that detects two dimensional signals. Pixel sensors include image sensors, which may convert a visual image to digital data that may be represented by a picture, i.e., an image frame. The pixel sensor cells are unit devices for the conversion of the two dimensional signals, which may be a visual image, into the digital data. A common type of pixel sensors includes image sensors employed in digital cameras and optical imaging devices. Such image sensors include charge-coupled devices (CCDs) or complementary metal oxide semiconductor (CMOS) image sensors.

While complementary metal oxide semiconductor (CMOS) image sensors have been more recently developed compared to the CCDs, CMOS image sensors provide an advantage of lower power consumption, smaller size, and faster data processing than CCDs as well as direct digital output that is not available in CCDs. Also, CMOS image sensors have lower manufacturing cost compared with the CCDs since many standard semiconductor manufacturing processes may be employed to manufacture CMOS image sensors. For these reasons, commercial employment of CMOS image sensors has been steadily increasing in recent years.

For typical CMOS image sensors, the images are captured employing a "rolling shutter method." FIG. 1 shows a typical prior art rolling shutter image capture and read out sequence. In the rolling shutter method, the imaged is captured on a row-by-row basis within a pixel array, i.e., the image is captured contemporaneously for all pixels in a row, but the capture of the image is not contemporaneous between adjacent rows. Thus, the precise time of the image capture is the same only within a row, and is different from row to row.

For each pixel in a row, the image is captured in its light conversion unit, which is a photosensitive diode. Charges generated from the light conversion unit are then transferred to a floating diffusion node. The amount of charge stored in the floating diffusion node is then read out of each pixel via a transistor wired in the source follower configuration whose gate is electrically connected the floating diffusion node. The voltage on the source of said source follower is then read out to column sample circuits, thereby completing the read out of all the pixels in the selected row, before moving on to the next row. This process is repeated until the image is captured by the pixels in all the rows, i.e., by the entire array of the pixels.

Since the same column sample circuits are employed to read out the data row by row without delay between the exposure and the read out, the read out of the rows of the image sensor is staggered between rows. Therefore, the exposure of the image sensor needs to be staggered row by row. In other words, different rows are exposed at different times. The resulting image is one where the each row captured actually represents the subject at a different time. Thus, for highly dynamic subjects (such as objects moving at a high rate of speed), the rolling shutter methodology can create image artifacts.

To solve this image artifact issue of capturing high speed objects, a global shutter method may be employed. FIG. 2 shows a typical prior art global shutter image capture and read out sequence. The global shutter method employs a global shutter operation, in which the entirety of the array of image sensors is reset prior to exposure simultaneously. The image for the whole frame is captured in the light conversion units of the pixels at the exactly same time for all the rows and columns. The signal in each light conversion unit is then transferred to a corresponding floating diffusion node. The voltage at the floating diffusion nodes is read out of the imager array on a row-by-row basis. The global shutter method enables image capture of high speed subjects without image artifacts, but introduces a concern with the global shutter efficiency of the pixel since the integrity of the signal may be compromised by any charge leakage from the floating diffusion node between the time of the image capture and the time of the reading of the imager array.

Specifically, in the rolling shutter method, the image signal is held at the floating diffusion node (FD) for a significantly shorter time than the actual time of exposure in the light conversion unit, e.g., a photodiode. Thus the contribution of the generation rate of the FD is orders of magnitude smaller than the generation rate during the integration time in the light conversion structure, e.g., the photodiode.

In contrast, the image signal is held at the FD for varying amounts of time in the global shutter method. For example, the signal from the first row may have the least wait time, which is the time needed to read out a single row. The signal from the last row has the greatest wait time which corresponds to the full frame read-out time, which is equal to the product of the number of rows in the array with the time needed to read out a single row. The charge on the floating diffusion may be degraded due to charge leakage or charge generation during the wait time for the last row. Any charge generations or charge leakage that occurs on the floating diffusion node during the wait time can have a significant impact to the quality of the signal that is read out of the imager.

Referring to FIG. 3, a prior art CMOS pixel sensor cell comprises a semiconductor substrate 8 and a transfer gate transistor formed thereupon. The semiconductor substrate 8 comprises a heavily-doped first conductivity type semiconductor layer 10, a lightly-doped first conductivity type semiconductor layer 12, an isolation structure 20 which may be shallow trench isolation, LOCOS, or other semiconductor isolation, and a surface pinning layer 34.

The heavily-doped semiconductor layer 10 comprises a heavily doped semiconductor material having a first conductivity type doping. The first conductivity type is p-type or n-type. The lightly-doped first conductivity type semiconductor layer 12 comprises a lightly-doped semiconductor material having the first conductivity type doping, which is a low concentration doping with first conductivity type dopants. The surface pinning layer 34 has a doping of the first conductivity type.

The semiconductor substrate 8 further comprises a second conductivity type charge collection well 30. A lightly-doped first conductivity type region 32 is a portion of the lightly-doped first conductivity type semiconductor layer 12 located directly underneath the second conductivity type charge collection well 30. The lightly-doped first conductivity type region 32 typically has the same dopant concentration as the rest of the lightly-doped first conductivity type semiconductor layer 12.

The lightly-doped first conductivity type region 32 and the second conductivity type charge collection well 30 collectively constitute a photodiode (32, 30) that generates electron-hole pairs. Charge carriers of the second conductivity type are collected in the second conductivity type charge collection well 30 in proportion to the amount of photons impinging into the photodiode (32, 30). Electron-hole pairs are generated within the depletion region of the photodiode (32, 30), due to photogeneration processes. Particularly, if the carrier is a carrier of the second conductivity type, the carrier accumulates in the second conductivity type charge collection well 30. The amount of charge that accumulates in the second conductivity type charge collection well 30 is nearly linear to the number of incident photons (assuming the photons have the same energy distribution).

The transfer gate transistor comprises a gate dielectric 50, a gate electrode 52, a gate spacer 58, a source, which is the second conductivity type charge collection well 30, and a drain, which is herein referred to as a floating drain 40. Specifically, the transfer gate transistor is integrally formed with the photodiode (30, 32) such that the second conductivity type charge collection well 30, which comprises a lightly-doped second conductivity type semiconductor material, is also a source of the transfer gate transistor. The second conductivity type is the opposite of the first conductivity type. For example, if the first conductivity type is p-type, the second conductivity type is n-type, and vice versa.

The floating drain 40 has a doping of the second conductivity type, and is electrically floating when the transfer transistor is turned off to enable storage of electrical charges. A first conductivity type well region 42 is formed by implantation of first conductivity type dopants under the floating drain 40.

Charge carriers of the second conductivity type, which are electrons or holes, accumulate in the second conductivity type charge collection well 30 when photons are incident on the photodiode (32,30). When the transfer transistor is turned on, the electrons in the second conductivity type charge collection well 30 are transferred into the floating drain 40, which is a charge collection well and stores electrical charge from the photodiode (30, 32) as data until a read circuit detects the amount of stored charge. Thus, the second conductivity type charge collection well 30 functions as the source of the transfer transistor while the transfer transistor is turned on. The turn-on of the transfer transistor corresponds to the transfer of the entire array from photosensitive diode to floating diffusion as described in FIG. 2.

In general, a difficulty in global shutter imaging is that the charge needs to stored in the floating diffusion 40 for a long time—up to the read out time for the entire frame which can be up to a tenth of a second or more. During this time, the leakage on the diffusion directly impacts the image quality. Obtaining high quality digital images in the global shutter operation scheme requires preservation of the charge in the floating drain 40 without any significant change in the amount of stored charge until the read out. The greater the leakage current of the floating drain, the greater the change in the amount of charge between the transfer from the second conductivity type charge collection well 30, which is a terminal of the photosensitive diode (30, 32), and the read out. Most leakages are time dependent and are characterized by a rate measured in an amount of charge leaked to or from the diffusion per unit time.

Since images are typically read out from top to bottom, the data from the top row of the image will be on the diffusion for a very short time before being read out and therefore very little noise will be added to this row due to leakage on the read out diffusion. This will gradually get worse to the bottom of the image. The data on the bottom row of the image will sit on the diffusion for the full read time of the frame and thus will have the largest leakage current. Thus, rolling shutter images are of worse quality at the bottom than the top. Leakage both creates a loss of contrast as well as fixed pattern noise, and both of these can be visibly worse at the bottom of the image. The human eye is very sensitive to such correlated noise and images which appear worse at one side are unacceptable for consumer photography.

Further, the amount of data distortion and the loss of image fidelity are also affected by local variations in the leakage current and the voltage at the floating drain of a CMOS pixel sensor cell, which depends on the amount of charge stored therein.

In view of the above, there exists a need to provide a method of alleviating the impact of image degradation due to the variations in the charge hold time among the different rows of an array of a CMOS image sensor operated in global shutter mode.

Further, there exists a need to provide a method for compensating for the leakage current to improve the signal-to-noise ratio of the image frame of the array of CMOS image sensors operated in global shutter mode.

SUMMARY OF THE INVENTION

To address the needs described above, the present invention provides methods for enhancing the image quality of an image frame from a complementary metal oxide semiconductor (CMOS) image sensor array.

In the present invention, the image quality of an image frame from a CMOS image sensor array may be enhanced by dispersing or randomizing the noise introduced by leakage currents from floating drains among the rows of the image frame. Further, the image quality may be improved by accounting for time dependent changes in the output of dark pixels in dark pixel rows or dark pixel columns. In addition, voltage and time dependent changes in the output of dark pixels may also be measured to provide an accurate estimate of the noise introduced to the charge held in the floating drains. Such methods may be employed individually or in combination to improve the quality of the image.

According to an aspect of the present invention, a method of operating an array of pixel sensor cells comprising:

exposing an entirety of an array of pixel sensor cells, wherein each of the pixel sensor cells contains a light conversion unit and a floating drain;

simultaneously transferring electrical charges from the light conversion unit to the floating drain in each of the array of pixel sensor cells; and sensing the electrical charges in the floating drains one row at a time and for each row in the array, wherein a temporal order of row sensing contains a sequence of rows in which at least one pair of sequentially neighboring rows is physically non-neighboring.

In one embodiment, the temporal order of row sensing may be determined by iterative partitioning of at least one physically contiguous block of rows and selecting of a predetermined number of physically non-neighboring rows from each partition of the at least one physically contiguous blocks, wherein the selected predetermined number of physically non-neighboring rows constitute sequentially contiguous rows in the temporal order.

In another embodiment, the method may further comprise:

generating a raw image frame comprising pixels having pixel values obtained by sensing of an entirety of the array; and generating a processed image frame by image processing, wherein pixel values of pixels of the raw image frame are locally averaged with weighting to provide processed pixel values for pixels of the processed image frame, wherein weighting of each the local pixel value correlates with a sequential location of a row to which each the local pixel belong in the temporal order of row sensing.

The weighting may comprise a distance dependent component and a sensing-order dependent component, wherein the distance dependent component is the same for a pair of pixels equal distance apart from a pixel for which processed pixel values are determined and belonging to different rows, and wherein the sensing-order component is greater for a pixel among the pair of pixels that belong to a row that is sensed earlier.

According to another aspect of the present invention, another method of operating an array of pixel sensor cells is provided, which comprises:

simultaneously exposing an entirety of an array of pixel sensor cells, wherein each of the pixel sensor cells contains a light conversion unit and a floating drain;

simultaneously transferring electrical charges from the light conversion unit to the floating drain in each of the array of pixel sensor cells;

sensing the electrical charges in the floating drains one row at a time and for each row in the array to generate raw pixel values for each pixel sensor cell;

measuring pixel values for dark pixels multiple times and generating wait-time-dependent background signal values for the array of pixel sensor cells, wherein the wait-time-dependent background signal values are dependent on a row read wait time for each row; and generating a set of noise-compensated pixel values by subtracting a corresponding wait-time-dependent background signal value from each of the raw pixel values.

The dark pixels may be located in an array of dark pixel rows and dark pixel columns interspersed among the array of pixel sensor cells, wherein the wait-time-dependent background signal values comprises an interpolated time-dependent map spanning the array of pixel sensor cells, and wherein the corresponding wait-time-dependent background signal value is interpolated from the interpolated time-dependent map.

According to yet another aspect of the present invention, yet another method of operating an array of pixel sensor cells is provided, which comprises:

exposing an entirety of an array of pixel sensor cells, wherein each of the pixel sensor cells contains a light conversion unit and a floating drain;

simultaneously transferring electrical charges from the light conversion unit to the floating drain in each of the array of pixel sensor cells; and sensing the electrical charges in the floating drains one row at a time and for each row in the array to generate raw pixel values for each pixel sensor cell;

measuring pixel values for dark pixels multiple times and generating wait-time-dependent background signal values for the array of pixel sensor cells;

measuring time dependence of a voltage of a floating drain of test dark pixels pre-charged at a voltage different from a reset voltage, and generating wait-time-and-voltage-dependent signal offset values from a difference between time dependence of the voltage and time dependence of the wait-time-dependent background signal values for the pixel sensor cells; and generating a set of noise-compensated pixel values by subtracting a corresponding wait-time-dependent background signal value and a corresponding wait-time-and-voltage-dependent signal offset value from each of the raw pixel values.

In one embodiment, each of the test dark pixels comprises:
a light conversion unit and an overlying light shield blocking entry of light into the instance of the light conversion unit;
a floating diffusion; and
a contact via electrically connected to the floating diffusion for providing electrical bias and measurement of voltage of the floating diffusion.

The method may further comprise repeating measuring time dependence of a voltage of a floating drain of test dark pixels pre-charged at different pre-charge voltages, and wherein the wait-time-and-voltage-dependent signal offset values are interpolated for measured values of pre-charge voltages.

According to yet another aspect of the present invention, a method of operating an array of pixel sensor cells includes:

exposing an entirety of an array of pixel sensor cells, wherein each of the pixel sensor cells contains a light conversion unit and a floating drain;

simultaneously transferring electrical charges from the light conversion unit to the floating drain in each of the array of pixel sensor cells;

sensing the electrical charges in the floating drains one row at a time and for each row in the array to generate raw pixel values for each pixel sensor cell;

measuring pixel values for dark pixels and generating wait-time-dependent background signal values for the array of pixel sensor cells; and generating a set of noise-compensated pixel values by subtracting a corresponding wait- time-dependent background signal value from each of the raw pixel values, wherein the dark pixels are located in an array of dark pixel rows and dark pixel columns interspersed among the array of pixel sensor cells, wherein the wait-time-dependent background signal values comprises an interpolated time-dependent map spanning the array of pixel sensor cells, and wherein the corresponding wait-time-dependent background signal value is interpolated from the interpolated time-dependent map.

DETAILED DESCRIPTION OF THE INVENTION

Figure 1:
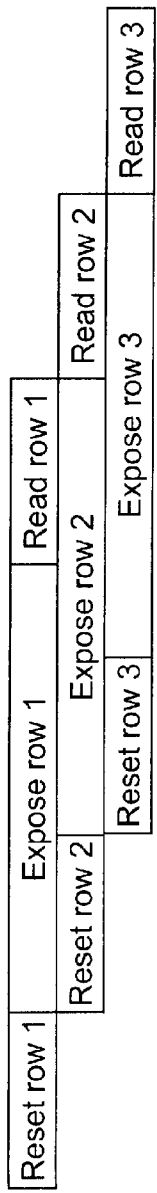
FIG. 1 is a prior art rolling shutter image capture and read out sequence.
Figure 2:
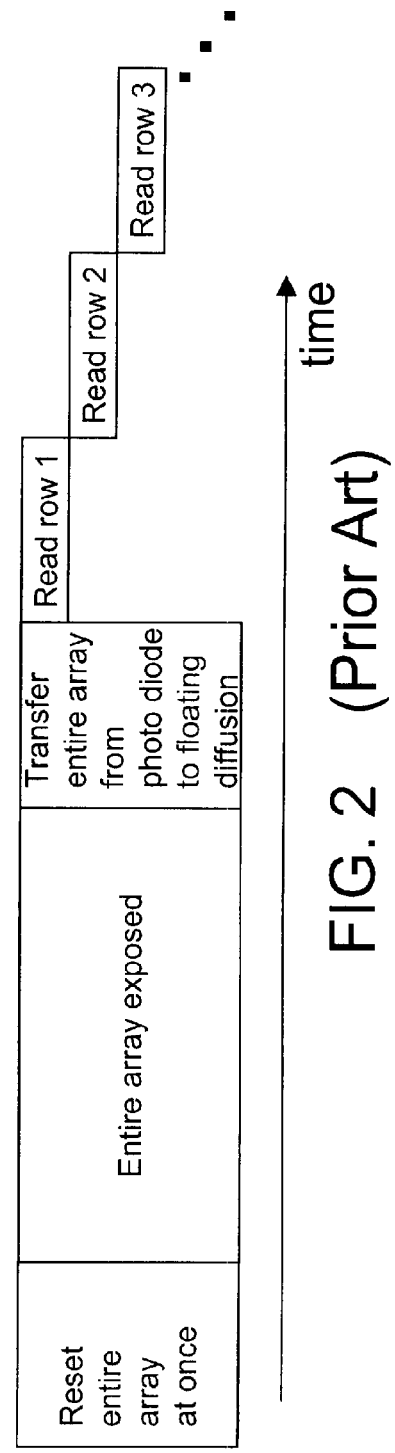
FIG. 2 is a prior art global shutter image capture and read out sequence.
Figure 3:
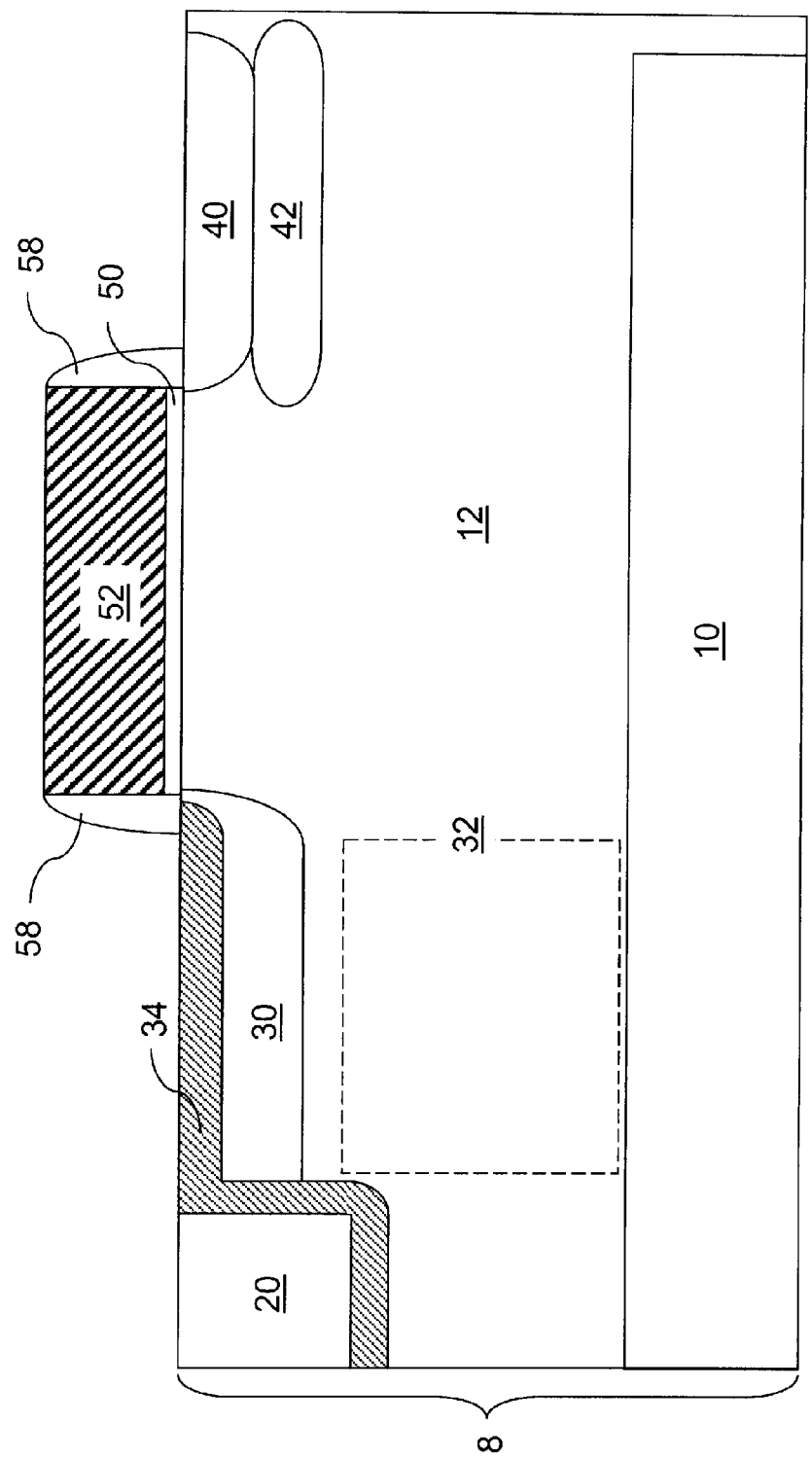
FIG. 3 is a vertical cross-sectional view of a prior art CMOS pixel sensor cell.

As stated above, the present invention relates to methods for enhancing the quality of image frames from a pixel sensor array, which are now described in detail with accompanying figures. It is noted that like and corresponding elements are referred to by like names or reference numerals in the figures.

Figure 4:
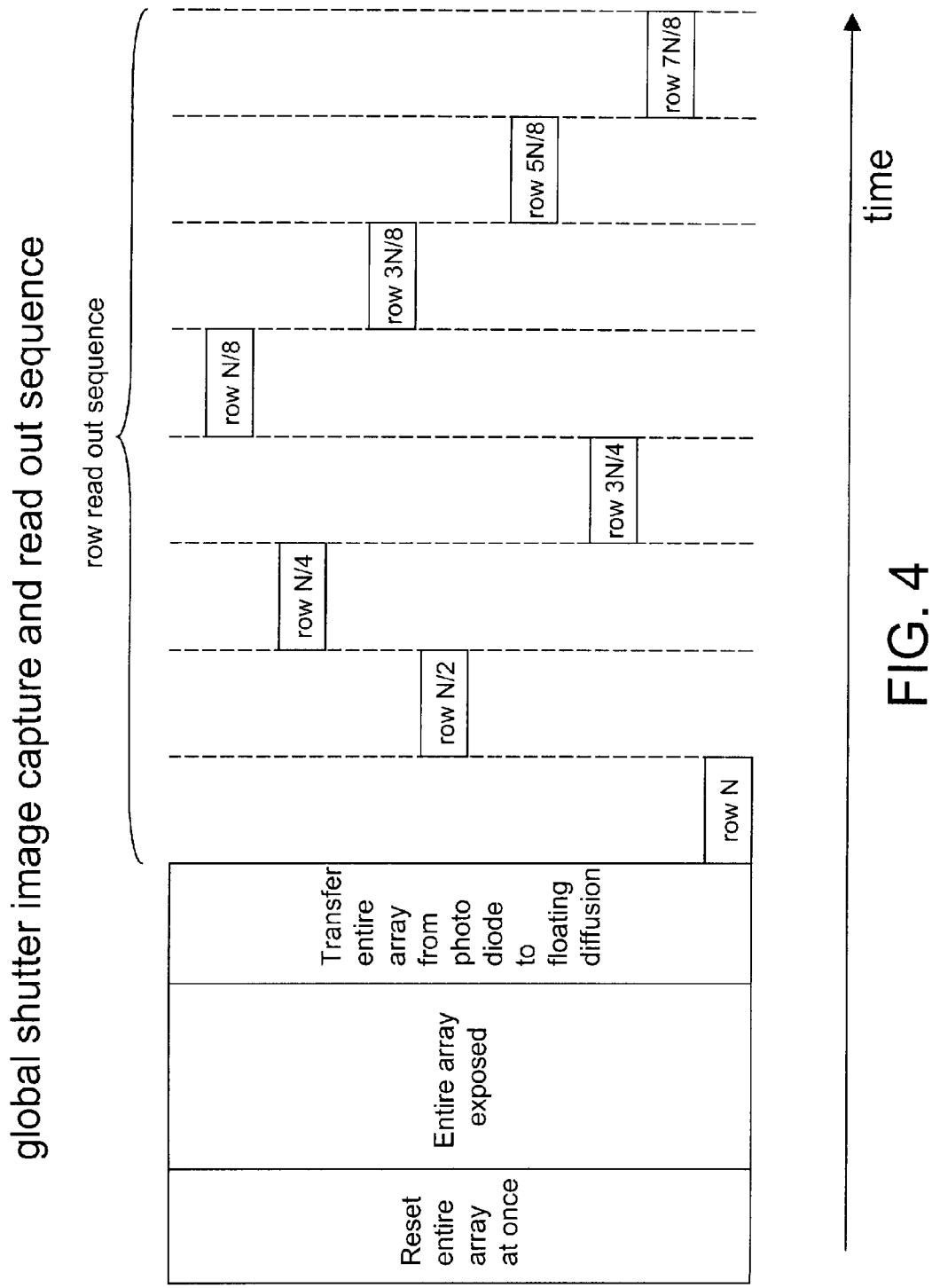
FIG. 4 is a first exemplary global shutter image capture and row read out sequence employing a first exemplary temporal order of row sensing according to a first aspect of the present invention.

Referring to FIG. 4, a first exemplary global shutter image capture and row read out sequence employing a first exemplary temporal order of row sensing is shown according to a first aspect of the present invention. The first exemplary global shutter image capture and row read out sequence comprises a global shutter image capture sequence and a first exemplary row read out sequence.

The global shutter image capture sequence employs a global shutter operation for an array of pixel sensor cells. Each of the pixel sensor cells in the array comprises a light conversion unit and a floating drain. The light conversion unit generates charge carriers when exposed to incident light. The floating drain stores the charge carriers after the exposure. In case the pixel sensor cell comprises a CMOS image sensor pixel, the charge transfer is effected by a transfer gate transistor. If the array of pixel sensor cells is a CMOS image sensor, a photosensitive diode may be employed as the light conversion unit.

Prior to exposure, the entire array of pixel sensor cells is reset simultaneously to remove any residual charge that may have been present in the light conversion unit. If the pixel sensor cell comprises a CMOS image sensor pixel, such a reset may be effected by turning on a reset transistor connected to a photosensitive diode, which is the light conversion unit of the CMOS image sensor pixel.

The entire array of pixel sensor cells is exposed to light simultaneously. In other words, the image for the whole frame is captured in the light conversion units of the pixel sensor cells at the exactly same time for all the rows and columns. The signal in the form of electrical charges in each light conversion unit is then simultaneously transferred to a corresponding floating diffusion within the pixel sensor cell containing the light conversion unit. The floating diffusion of the pixel sensor cells in the array holds the data for the image frame in the form of electrical charges.

In the first exemplary row read out sequence, charges stored in the floating diffusions of the array read out one row at a time and for each row in the array. According to the present invention, a temporal order of row sensing in the read out sequence contains a sequence of rows in which at least one pair of sequentially neighboring rows is physically non-neighboring. Therefore, the temporal order of row sensing not the same as any physical order of rows from one end of the array to another end of the array. This contrasts with prior art temporal order of row sensing in which the order of row sensing coincides with a physical order of rows from one end of the array to another end of the array, e.g., from a first row to the last row of the array. Temporal order herein denotes an order in time of rows that are sensed during the first read out sequence. Physical order herein denotes an order in a physical space of rows in the array based on physical layout, i.e., geometry in the physical arrangement of the rows of the array.

The temporal order of row sensing is characterized as an out-of-order read out for the image frame from the global shutter operation. Instead of reading the rows according to the sequence of the physical arrangement of the rows, e.g., from a physical first row to a physical last row, the rows are read in a pattern which samples rows from different portions of the entire image, e.g., a top portion, a middle portion, and a bottom portion, early in the read out sequence. The unread rows at this point are subsequently read as more rows to be sensed are selected from the remaining unsensed rows. The unread rows in the array of pixel sensor cells are reduced as more and more rows are read in time until all of the rows are read out. Preferably, the local density of read rows increases uniformly across the array and steadily in time.

The sequential pattern of sensed rows, which is determined by the temporal order may vary among embodiments. For example, a binary pattern or random pattern of row read out may be employed for the temporal order. Preferably, at any point in the read, the number of rows read out from among the entirety of rows in the array is approximately the same for every portion of the image.

Such a read out pattern according to the present invention provides many advantages. First, the average noise in any part of the image is the same. The noise is generated by a leakage current from the floating drain during the time between the transfer of charges into the floating drain and the read out of the charges from the floating drain. Since the row read out order will be evenly distributed from the top to the bottom of the array, the noise will be evenly distributed across the entirety of the image instead of a distribution in a correlated fashion from the top of the image to the bottom, which results in a localized and concentrated distribution of the noise at the bottom of the image. Such a uniform distribution of the noise makes the image appear less noisy to the human eye than a correlated distribution of the noise in a localized manner.

Second, since the location of the rows read early in the sequence is known, de-noising techniques can be used which more heavily weight rows which are read out earlier over rows which are read later in the read sequence. Such weighted correction of the noise provides an enhanced noise reduction technique, in which the raw image frame from the array of pixel sensor cells may be processed to generate a processed image frame such as a contrast enhanced image frame.

Preferably, all pairs of sequentially neighboring rows in the temporal order are physically non-neighboring in the array. In other words, a row having a k-th position in the temporal order and another row having a (k+1)-th position in the temporal order are not physically neighboring in the array of pixel sensor cells. k may be any positive integer less than the total number of rows in the array of pixel sensor cells. For example, if the row having the k-th position in the temporal order is a physical l-th row, i.e., a row located separated from a first row at the edge of the array of pixel sensor cells by exactly (l−1) other rows, the row having the (k+1)-th position in the temporal order is not a physical (l−1)-th row or a physical (l+1)-th row. l may be any positive integer less than the total number of rows in the array of pixel sensor cells. 0-th row is considered to be non-existent.

Similarly, all pairs of physically neighboring pairs of rows in the array sequentially non-neighboring pairs in the temporal order. A physical l-th row and a physical (l+1)-th row are physically neighboring in the array of pixel sensor cells. l may be any positive integer less than the total number of rows in the array of pixel sensor cells. The physical l-th row and the physical (l+1)-th row are not sequentially neighboring in the temporal order. For example, if the physical l-th row has a k-th position in the temporal order, the physical (l+1)-th row does not have a (k−1)-th position or a (k+1)-th position in the temporal order. k may be any positive integer less than the total number of rows in the array of pixel sensor cells. 0-th row is considered to be non-existent.

Rows having adjacent positions in the temporal order are herein referred to as sequentially contiguous rows. For example, an m-th entry of the temporal order and an (m+1)-th entry in the temporal order are sequentially contiguous rows. The m-th entry of the temporal order is herein referred to as a temporal m-th row, and the (m+1)-th entry of the temporal order is herein referred to as a temporal (m+1)-th row.

The temporal order may comprise a set of sequentially contiguous rows, wherein each row in the set belongs to a different physically contiguous block of rows located in the array and having a number of rows, which is herein referred to as a first number of rows. Each of the physically contiguous blocks of rows is bounded by a pair of rows that precede the set in the temporal order or by a row that precedes the set in the temporal order and one of an outer edge of a physical first row and a physical last row in the array.

In the first exemplary temporal order of row sensing, the total row number N represent the number of the entirety of the rows in the array of pixel sensor cells. In this example, the first row to be read out is the physical N-th row. The second row to be read out is the physical (N/2)-th row. The third row to be read out is the physical (N/4)-th row. The fourth row to be read out is the physical (3N/4)-th row. The fifth row to be read out is the physical (N/8)-th row. The sixth row to be read out is the physical (3N/8)-th row. The seventh row to be read out is the physical (5N/8)-th row. The eighth row to be read out is the physical (7N/8)-th row. The ninth row to be read out is the physical (N/16)-th row; the tenth, the physical (3N/16)-th row; the eleventh, the physical (5N/16)-th row; the twelfth, the physical (7N/16)-th row; the thirteenth, the physical (9N/16)-th row; etc.

An exemplary set of sequentially contiguous rows in the above example include the fifth row to be read out, the sixth row to be read out, the seventh row to be read out, and the eighth row to be read out. In other words, one example of the set of sequentially contiguous rows include a temporal fifth row, a temporal sixth row, a temporal seventh row, and a temporal eighth row. The temporal fifth row is the physical (N/8)-th row, a temporal sixth row is the physical (3N/8)-th row, a temporal seventh row is the physical (5N/8)-th row, and a temporal eighth row is the physical (7N/8)-th row.

Each row in the set belongs to a different physically contiguous block of rows located in the array and having a first number of rows. In this example, the temporal fifth row belongs to a first physically contiguous block of rows including the first row through the (N/4−1)-th row. The temporal sixth row belongs to a second physically contiguous block of rows including the (N/4+1)-th row through the (N/2−1)-th row. The temporal seventh row belongs to a third physically contiguous block of rows including the (N/2+1)-th row through the (3N/4−1)-th row. The temporal eighth row belongs to a fourth physically contiguous block of rows including the (3N/4+1)-th row through the (N−1)-th row. Each of the four physically contiguous block of rows are different. The first number of rows is N/4-1.

Each of the physically contiguous blocks of rows is bounded by a pair of rows that precede the set in the temporal order or by a row that precedes the set in the temporal order and one of an outer edge of a physical first row and a physical last row in the array. In this example, first physically contiguous block of rows is bounded by a pair of an outer edge of a physical first row, which is one of the physical boundaries of the array of pixel sensor cells, and the (N/4)-th row, which is the temporal third row that precedes the set in the temporal order. In other words, since the (N/4)-th row is the temporal third row and the set of sequentially contiguous rows includes the temporal fifth row through the temporal eighth row, the physically contiguous block of rows is bounded by a row, i.e., the temporal third row, that precedes the set of sequentially contiguous rows. The second physically contiguous block of rows is bounded by a pair rows that precede the set, and particularly by the set of the (N/4)-th row, which is the temporal third row, and the (N/2)-th row, which is the temporal second row. Both the temporal third row and the temporal second row precede the set of temporal fifth through eighth rows in the temporal order. Similarly, the third physically contiguous block of rows is bounded by a pair rows that precede the set, and particularly by the set of the (N/2)-th row, which is the temporal second row, and the (3N/4)-th row, which is the temporal fourth row. Both the temporal second row and the temporal fourth row precede the set of temporal fifth through eighth rows in the temporal order. The fourth physically contiguous block of rows is bounded by a row that precedes the set in the temporal order and a physical last row in the array, which is the pair of the physical (3N/4)-th row, which is the temporal fourth row, and the physical N-th row, which is the temporal first row. Both the temporal fourth row and the temporal first row precede the set of temporal fifth through eighth rows in the temporal order.

Variations of the first exemplary temporal order are explicitly contemplated herein in which a discrete number of rows are changed in position in the temporal order without rendering the temporal order identical to any physical order of rows from one end of the array to another end of the array. Specifically, moving the position of the physical N-th row from the temporal first row to other temporal row positions are explicitly contemplated herein. Also, moving the position of the physical first row to a temporal first position, a temporal second position, or a temporal third position is also explicitly contemplated herein. In general, any discrete number of changes among the positions in the temporal order so that at least one pair of sequentially neighboring rows is physically non-neighboring. Preferably, the temporal order is changed without substantially affecting the uniform distribution of overall density of sensed rows across the various portions of the array so that the noise is evenly distributed across the entirety of the array.

The temporal order may comprise another set of sequentially contiguous rows that follow the set of sequentially contiguous rows. Each row in the other set belongs to another different physically contiguous block of rows located in the array and having a second number of rows. The first number is greater than twice the second number.

For example, the other set of sequentially contiguous rows may comprise the temporal ninth row through temporal sixteenth row, which corresponds to a set of the physical (N/16)-th row, the physical (3N/16)-th row, the physical (5N/16)-th row, the physical (7N/16)-th row, the physical (9N/16)-th row, the physical (11N/16)-th row, the physical (13N/16)-th row, and the physical (15N/16)-th row.

Each of the other physically contiguous blocks of rows is bounded by a row that precedes the set and another row that is in the set in the temporal order or by a row that is in the set in the temporal order and one of the physical first row and the physical last row in the array. For example, each of the other physically contiguous blocks of rows may be bounded by a row, which may be one of the temporal first row through the temporal fourth row, that precedes the set, i.e., the set of sequentially contiguous rows including the temporal fifth row through the temporal eighth row, and another row that is in the set in the temporal order. Alternately, each of the other physically contiguous blocks of rows may be bounded by a row that is in the set in the temporal order and one of the physical first row and the physical last row in the array. Similar analysis applies to the other set of sequentially contiguous rows containing temporal ninth row through temporal sixteenth row as the set of sequentially contiguous rows containing temporal fifth row through temporal eighth row.

The order of physical rows in some sets of sequentially contiguous rows may be mathematically expressed. In an array of pixel sensor cells includes a physically contiguous subset of the array of rows including (N−1) physically adjoined rows, row numbers from 1 to (N−1) may be assigned in a monotonically increasing order to each row in the physically contiguous subset of the array in an order corresponding to an order of monotonically increasing distance from an edge row of the physically contiguous subset of the array. In this case, $N=2^n$, and $n$ is a positive integer, and the subset comprises (N−1) rows.

The temporal order for this subset may be the same as the first exemplary temporal order less the first entry, i.e., a modification of the first exemplary temporal order by removing the physical N-th row. In this case, the temporal order may be determined based on an order of row numbers sequentially generated by a formula $(2 \times j-1) \times N/2i$, wherein i is an integer that varies from 1 to n by an increment of 1, and wherein j is an integer that varies from 1 to $2^{(i-1)}$ for each value of i prior to incrementing a value of the i. For example, the temporal first row of this temporal order is obtained by setting i and j equal to 1, which generates a physical (N/2)-th row for the temporal first row. The temporal second row and the temporal third row of this temporal order is obtained by setting i equal to 2 and by varying j from 1 to 2, which generates a physical (N/4)-th row for the temporal second row and a physical (3N/4)-th row for the temporal third row. The temporal fourth row through the temporal seventh row of this temporal order is obtained by setting i equal to 3 and by varying j from 1 to 4, which generates a physical (N/8)-th row for the temporal fourth row, a physical (3N/8)-th row for the temporal fifth row, a physical (5N/8)-th row for the temporal sixth row, and a physical (7N/8)-th row for the temporal seventh row.

Figure 5:
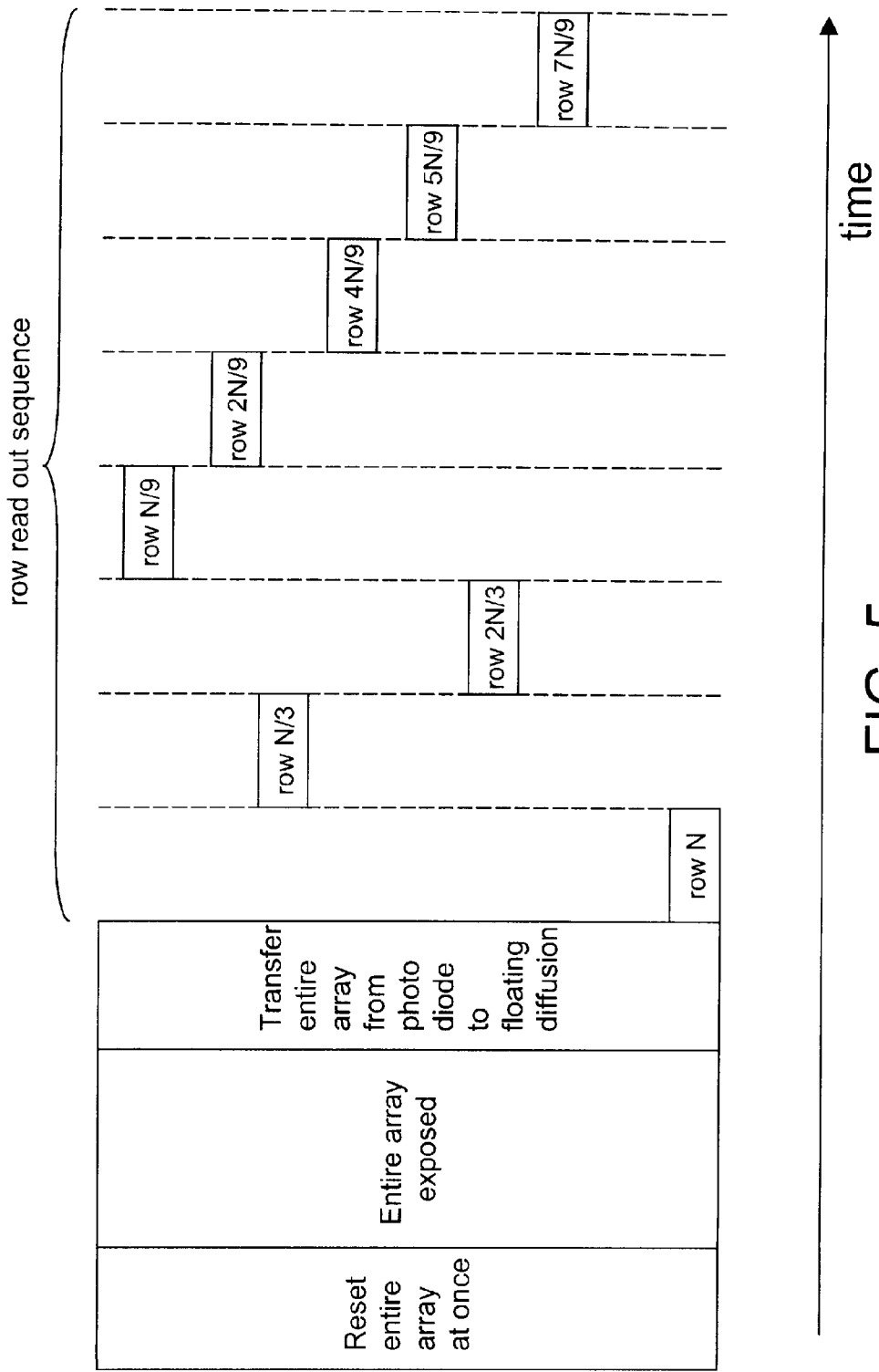
FIG. 5 is a second exemplary global shutter image capture and row read out sequence employing a second exemplary temporal order of row sensing according to the first aspect of the present invention.

Referring to FIG. 5, a second exemplary row read out sequence employing a second exemplary temporal order of row sensing is shown according to the first aspect of the present invention. In general, the temporal order of row sensing may be determined by iterative partitioning of at least one physically contiguous block of rows. A predetermined number of physically non-neighboring rows from each partition of the at least one physically contiguous blocks may be selected. The selected predetermined number of physically non-neighboring rows constitute sequentially contiguous rows in the temporal order.

In the second exemplary row read out sequence, the predetermined number is 2. In light of this view, the predetermined number is 1 for the first exemplary row read out sequence of FIG. 4.

In general, the integer is less than half of a total count of rows in each of the at least one physically contiguous block. This is because division of an array into a number of blocks that exceeds half of the total count of rows invariably generates neighboring rows in the temporal order. Each partition of the at least one physically contiguous blocks may, or may not, have a same number of rows therein. Preferably but not necessarily, each partition of the at least one physically contiguous blocks may, or may not, have the same number of rows therein.

According to the present invention, a raw image frame may be subjected to image processing to generate a processed image frame so that noise level of the processed image frame is reduced compared to the raw image frame. The raw image frame comprises pixels having pixel values obtained by sensing of an entirety of the array of pixel sensor cells. The processed image frame is generated by image processing.

During the image processing, pixel values of pixels of the raw image frame are locally averaged with weighting to provide processed pixel values for pixels of the processed image frame. The weighting of each the local pixel value correlates with a sequential location of a row to which each the local pixel belong in the temporal order of row sensing. Specifically, the earlier the sensing for a given pixel, the higher weighting is given to the pixel values of pixels of the raw image frame when other factors are the same such as the distance between the pixel, i.e. the target pixel, for which the processed pixel value is calculated and the local pixel that provides a compensatory adjustment to the pixel value for the target pixel.

For example, the weighting may comprise a distance dependent component and a sensing-order dependent component. The distance dependent component is the same for a pair of pixels equal distance apart from a pixel for which processed pixel values are determined and belonging to different rows. The sensing-order component is greater for a pixel among the pair of pixels that belong to a row that is sensed earlier. More weight to an early read pixel relative to a later read pixel reduces overall noise in the processed image frame. Thus, the information from the temporal order is applied to enhance dynamic range and reduce noise in the processed image frame.

Figure 6:
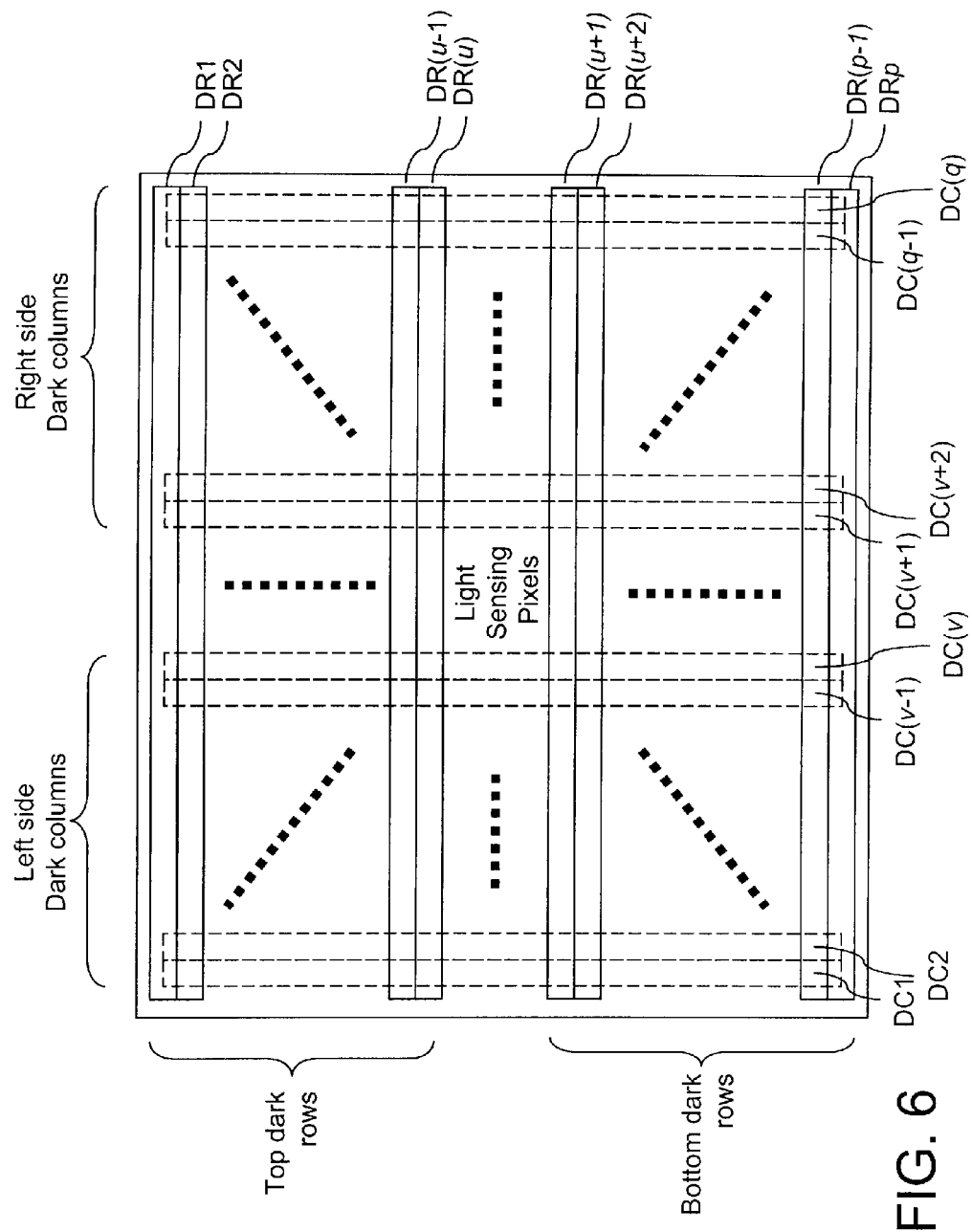
FIG. 6 is a top-down view of a first exemplary structure for an array of pixel sensor cells according to a second aspect of the present invention.

Referring to FIG. 6, a top-down view of a first exemplary structure is shown, which includes a semiconductor device including an array of pixel sensor cells according to a second aspect of the present invention. The first exemplary structure comprises an array of pixel sensor cells, dark pixel rows containing dark pixels, and dark pixel columns containing additional dark pixels. Each pixel sensor cell comprises a light conversion unit and a floating drain. For example, the light conversion unit may be a photosensitive diode and the pixel sensor cells may be complementary metal oxide semiconductor (CMOS) image sensor cells.

Dark pixels are formed at the edged of the array of pixel sensor cells. Each of the dark pixels comprises an instance of the light conversion unit and an overlying light shield blocking entry of light into the instance of the light conversion unit. The signal generated from a measurement on the dark pixel immediately after the charge transfer provides a "dark floor" which is an estimation of a voltage output from a pixel sensor cell that is not illuminated by any incident light during the simultaneous global exposure of the array of pixel sensor cells. The measured value of the dark floor is used to calibrate the output of the image signal from the array of pixel sensor cells.

The dark pixel rows are labeled DR1, DR2, . . . , DR(u−1), DR(u), DR(u+1), DR(u+2), DR(p−1), and DRp, i.e., the first exemplary structure comprises p number of dark pixel rows. The dark pixel rows may be grouped into top dark rows and bottom dark rows. The top dark rows include the dark pixel rows labeled DR1, DR2, . . . , DR(u−1), DR(u) located in the top portion the first exemplary structure, of which the total count is an integer u. The bottom dark rows include the dark pixel rows labeled DR(u+1), DR(u+2), . . . , DR(p−1), DR(p) located in the bottom portion the first exemplary structure, of which the total count is an integer p−u. The dark pixel columns are labeled DC1, DC2, . . . DC(v−1), DC(v), DC(v+1), DC(v+2), . . . , DC(q−1), and DCq, i.e., the first exemplary structure comprises q number of dark pixel columns. The dark pixel columns may be grouped into left dark columns and right dark columns. The left dark columns include the dark pixel columns labeled DC1, DC2, . . . , DC(v−1), DC(v)

located in the left portion the first exemplary structure, of which the total count is an integer v. The right dark columns include the dark pixel columns labeled DC(v+1), DC(v+2), . . . , DC(q−1), DC(q) located in the right portion the first exemplary structure, of which the total count is an integer q−v. The number p is typically between 10 and 100 for an array having more than 500 rows. The number q is typically between 10 and 100 for an array having more than 500 columns. In a variation of the first exemplary structure, the dark pixel columns may be omitted. In another variation of the first exemplary structure, the dark pixel rows may be omitted.

While FIG. 6 corresponds to a case in which all dark pixel rows are classified into top dark rows and bottom dark rows, embodiments are contemplated herein in which a center row not belonging to the top dark rows or bottom dark rows is present. Further, embodiments that the dark rows are classified into more than two groups are explicitly contemplated herein. Further, while FIG. 6 corresponds to a case in which all dark pixel columns are classified into left dark columns and right dark columns, embodiments are contemplated herein in which a center column not belonging to the left dark columns or right dark columns is present. Further, embodiments that the dark columns are classified into more than two groups are explicitly contemplated herein.

Some of the dark pixels are located in the dark pixel rows are at the top and or the bottom of the array of pixel sensor cells. Some other dark pixels are located in the dark pixel columns that are at the left and or the right of the array of pixel sensor cells. In general, the dark pixels are located in an array, which is a dark pixel array, of dark pixel rows and dark pixel columns located at the edges of the array of pixel sensor cells. Although it is shown in FIG. 6, there is no requirement for the dark columns to be on both sides of the array. Many imager designs contain dark columns on one side of the array only. Similarly, many imager designs contain dark rows only at the top or only at the bottom of the array. If dark rows are physically present on both sides of the array, there is no requirement that the number of dark rows be the same on both sides. Similarly, there is no requirement that the number of dark columns be the same on the top and the bottom. The physical location of the dark rows and columns is not of importance for the operation of this invention.

During operation, an entirety of the array of pixel sensor cells is exposed to incident light. Each of the pixel sensor cells contains a light conversion unit and a floating drain as described above. Each light conversion unit generates electrical charges. The electrical charges are then simultaneously transferred from the light conversion unit to the floating drain in each of the array of pixel sensor cells. The electrical charges in the floating drains are sensed one row at a time and for each row in the array to generate raw pixel values for each pixel sensor cell.

Employing the dark pixel rows and/or dark pixel columns, pixel values for dark pixels are measured throughout the sensing operation of the array of image sensor pixels. The dark pixels in dark columns are measured along with the row in which the pixels are located. Thus, the temporal order or row read described previously will also determine the times in which the pixels in the dark columns are read. The dark rows can be read at any point during the array read. Preferably, the read out of the dark rows will be dispersed in time through out the read of the array. Each measurement on the pixel values for the dark pixels generates a background signal value corresponding to the wait time of the measurement, which is the time interval between the charge transfer and the measurement. The collection of the background signal values as a function of wait time is compiled to generate wait-time-dependent background signal values for the pixel sensor cells.

The wait-time-dependent background signal values for the pixel sensor cells are advantageously employed to provide subtraction of a time dependent background signal from the raw pixel values of the pixel sensor cells. The wait-time-dependent background signal values are dependent on the row read wait time, unlike the dark floor value, which is the measurement of the background immediately after the charge transfer into the floating drains and which is a row read delay time independent quantity.

Specifically, a set of noise-compensated pixel values are generated by subtracting a corresponding wait-time-dependent background signal value from each of the raw pixel values. By performing a subtraction on all the data for raw pixel values in the array, a noise-compensated image frame is generated from the set of noise-compensated pixel values. The noise compensation reflects the physical environment in which the array of the pixel sensor cells is placed, such as ambient temperature, as well as time dependence of the cumulative effects of leakage currents from the floating drains.

Figure 7:
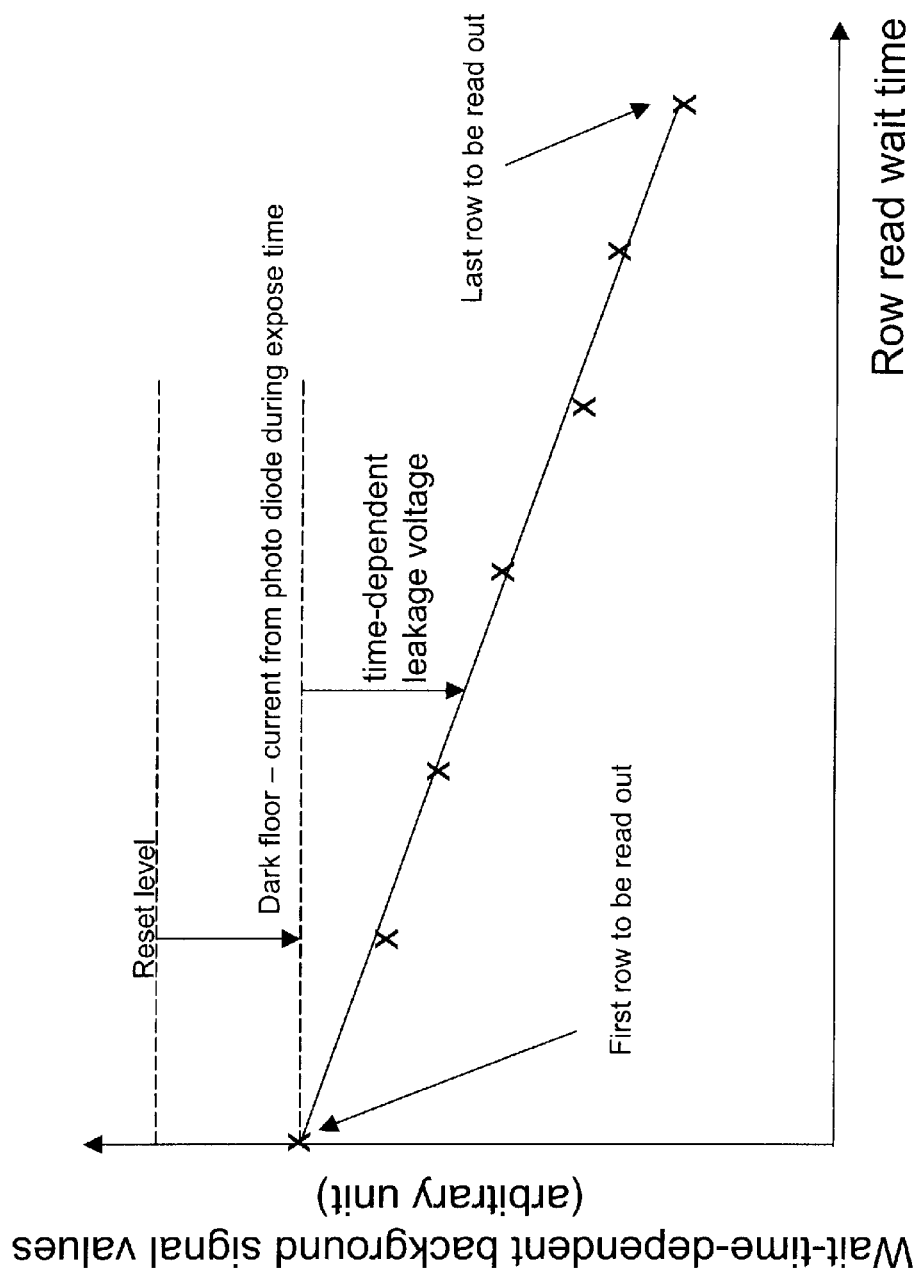
FIG. 7 is a graph of wait-time dependent background signal values as a function of wait time between global transfer and row read according to the second aspect of the present invention.

Referring to FIG. 7, an exemplary graph of wait-time-dependent background signal values as a function of row read wait time is shown. To generate such a graph, the measuring pixel values for dark pixels are fitted with an analytical function of wait time, which is the time period between the simultaneous transferring of electrical charges and the sensing of the electrical charges. The wait-time-dependent background signal values may be generated as a map encompassing the array of the pixel sensor cells. In this case, the wait-time-dependent background signal values comprise an interpolated time-dependent map spanning the array of pixel sensor cells. The corresponding wait-time-dependent background signal value is interpolated from the interpolated time-dependent map for the purposes of calculating noise-compensated pixel values.

Figure 8:
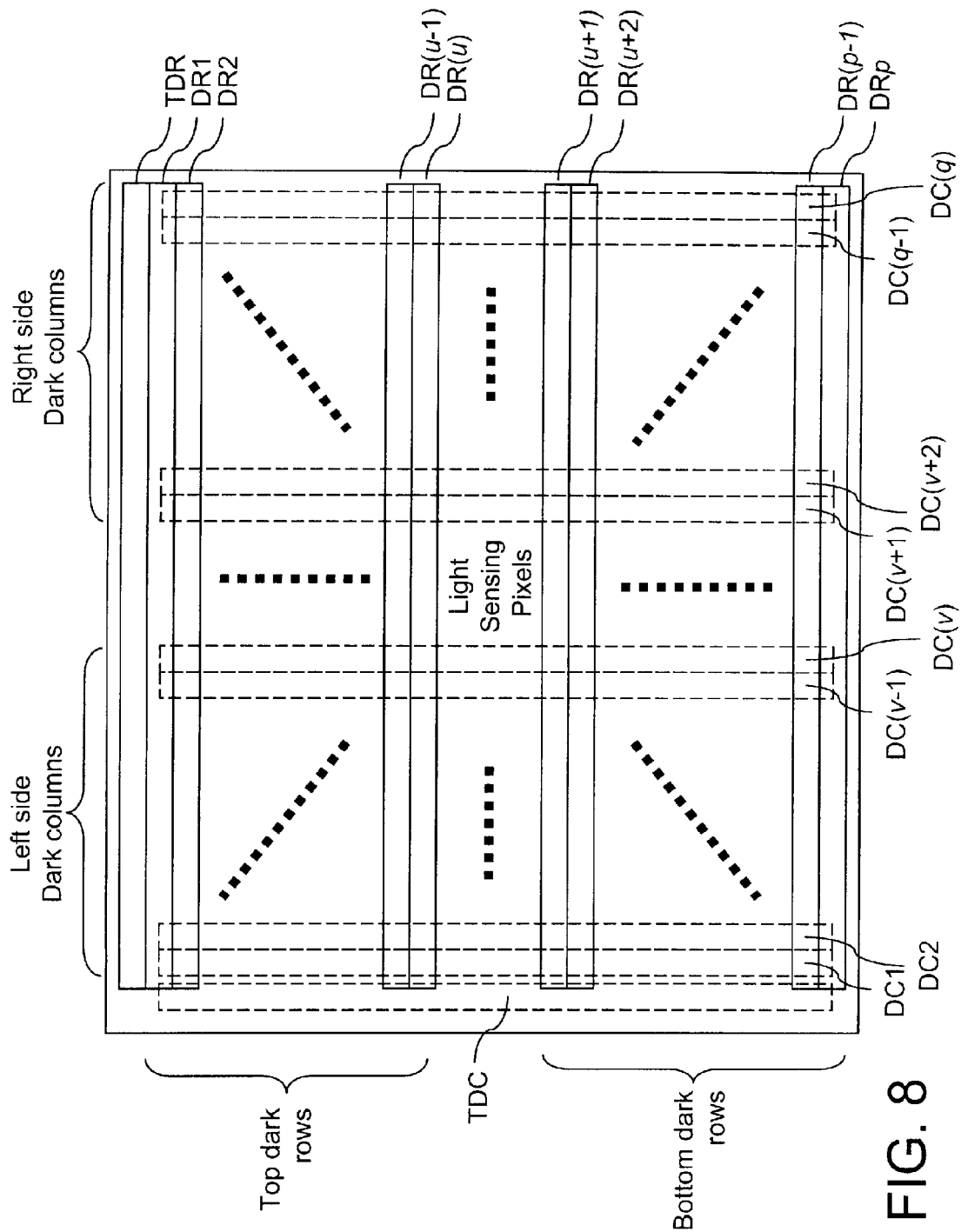
FIG. 8 is a top-down view of a second exemplary structure for an array of pixel sensor cells according to a third aspect of the present invention.

Referring to FIG. 8, a second exemplary structure for an array of pixel sensor cells is shown, which includes a semiconductor device including an array of pixel sensor cells according to the third aspect of the present invention. The second exemplary structure comprises an array of pixel sensor cells, dark pixel rows containing dark pixels, and dark pixel columns containing additional dark pixels, each of which provides the same functionality as in the first exemplary structure of FIG. 6. In addition, the second exemplary structure comprises test dark pixels, which may be incorporated into one or more test dark rows TDR and/or a test dark columns TDC.

Each of the test dark pixels comprises an instance of the light conversion unit, an overlying light shield blocking entry of light into the instance of the light conversion unit, an instance of floating diffusion, and a contact via electrically connected to the photo diode for providing an external electrical bias which can be transferred to the floating diffusion. Thus, each floating drain of the test dark pixels may be electrically biased at a predetermined voltage to pre-charge the floating drain. After setting the pre-charging of the floating drain of the test dark pixels, the change in the voltage of the floating drain may be measured over a time scale that is needed for readout of the array of the pixel sensor cells.

The array of the pixel sensor cells of the second exemplary structure may be operated in the same manner as the array of the pixel sensor cells of the first exemplary structure. Specifically, the entirety of the array of pixel sensor cells is exposed to incident light. The electrical charges are then simultaneously transferred from the light conversion unit to the floating drain in each of the array of pixel sensor cells. The electrical charges in the floating drains are sensed one row at a time and for each row in the array to generate raw pixel values for each pixel sensor cell. The wait-time-dependent background signal values are measured and advantageously employed to provide subtraction of a time dependent background signal from the raw pixel values of the pixel sensor cells as in the operation of the first exemplary structure.

In addition to the noise compensation employed for the first exemplary structure, additional noise compensation is performed according to the third aspect of the present invention. Particularly, time dependence of the voltage of a floating drain of test dark pixels that are pre-charged at a voltage different from a reset voltage is measured. The wait-time-dependent background signal value measurements are now performed as a function of the bias at the transfer time.

For pixels which have no illumination, there will be no charge in the photo diode and the voltage on the floating diffusion after the charge transfer will be the reset voltage (the same voltage as before the transfer. As illumination increases, the charge in the photo diode increases. This charge is transferred to the floating diffusion lowering its potential. Thus the voltage on the floating diffusion right after the global transfer is a function of the illumination level. Charge may then leak away from the floating diffusion, typically to the substrate. The rate at which charge leaks may be dependent upon the starting voltage. Employing dark pixels to calibrate the wait-time-dependent background signal value accurately simulates pixels which shave little or no illumination. Employing test dark pixels with a forced bias can accurately simulate the row read wait-time leakage dependence of pixels which have varying amounts of illumination.

In general, the time dependence of the voltage of the floating drain can be dependent upon the starting voltage of the floating drain. The measurement of time dependence of voltage of a floating drain of test dark pixels may be repeated at different pre-charge voltages. Since the results of the measurement of time dependence of voltage of a pre-charged floating drain depends on the pre-charge voltage, the measured value from this measurement is herein referred to as wait-time-and-voltage-dependent background signal offset value. In other words, the background signal is offset by an amount that depends on the wait time and the pre-charge voltage, or the voltage employed to pre-charge the floating drain. Wait-time-and-voltage-dependent signal offset values are generated from the difference between time dependence of the voltage at a pre-charged floating drain, i.e., the time dependent change from the pre-charge voltage, and the time dependence of the wait-time-dependent background signal values, i.e., the time dependent change from the reset voltage of the floating drain, for the pixel sensor cells for each pre-charge voltage. The wait-time-and-voltage-dependent signal offset values may be interpolated between measured values of pre-charge voltages for any arbitrary initial voltage at the floating drain.

Figure 9:
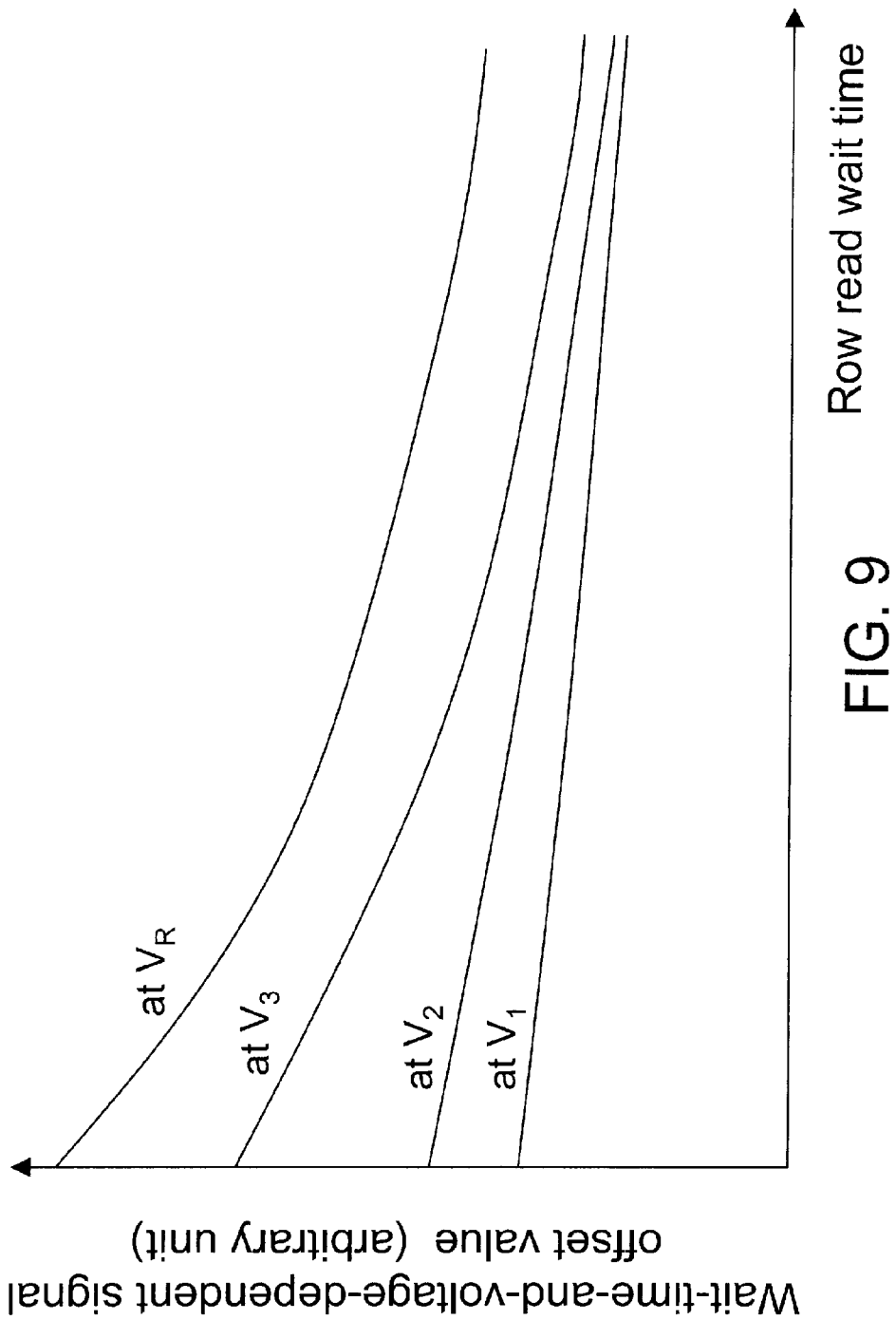
FIG. 9 is a graph of wait-time-and-voltage-dependent background signal offset values as a function of wait time according to the third aspect of the present invention.

Referring to FIG. 9, an exemplary graph of wait-time-and-voltage-dependent background signal offset values as a function of wait time is shown. If the floating drain is set at the reset voltage, i.e., if no charge is transferred into the floating drain, the "pre-charge" voltage is equal to the reset voltage, which is typically close to Vdd. The curve for this case, labeled "at $V_R$" and corresponding to the case of the pre-charge voltage being the same as the reset voltage.

As the pre-charge voltage deviates from the reset voltage, the wait-time-and-voltage-dependent background signal offset values as a function of wait time can change. The exemplary graph of FIG. 9 shows three curves corresponding to $V_1$, $V_2$, and $V_3$.

From the wait-time-and-voltage dependence of the signal offset values, an initial voltage for any pixel sensor cell if the wait time and the voltage at the time of the read out are given. Thus, the combination of the wait-time-dependent background signal values and wait-time-and-voltage-dependent signal offset values enable reconstruction of the voltage at each pixel sensor cell once the voltage measurement at the time of the readout and the wait time for that row are known. A set of noise-compensated pixel values may be generated by subtracting a corresponding wait-time-dependent background signal value and a corresponding wait-time-and-voltage-dependent signal offset value from each of the raw pixel values. The noise-compensated pixel values reflect the estimated amount of charge in each pixel sensor cell after accounting for the impact of the circuit ambient, e.g., temperature, any inherent offsets of the array of pixel sensor cells due to variations during manufacture of the array, the differences in wait time between the charge transfer into the floating drain and the read out time for each row, and any voltage and time dependent offset due to the presence of charge in the floating region compared with the state of a charge-free floating drain. Such noise-compensation scheme generates high-fidelity wide dynamic range image frames from the array of pixel sensor cells.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. A method of operating an array of pixel sensor cells comprising:
    exposing an entirety of an array of pixel sensor cells, wherein each of said pixel sensor cells contains a light conversion unit and a floating drain;
    simultaneously transferring electrical charges from said light conversion unit to said floating drain in each of said array of pixel sensor cells;
    sensing said electrical charges in said floating drains one row at a time and for each row in said array to generate raw pixel values for each pixel sensor cell;
    measuring pixel values for dark pixels and generating wait-time-dependent background signal values for said array of pixel sensor cells, wherein said wait-time-dependent background signal values are dependent on a row read wait time for each row; and
    generating a set of noise-compensated pixel values by subtracting a corresponding wait-time-dependent background signal value from each of said raw pixel values.

2. The method of claim 1, further comprising generating an image frame from said set of noise-compensated pixel values.

3. The method of claim 1, wherein each of said dark pixels comprises an instance of said light conversion unit and an overlying light shield blocking entry of light into said instance of said light conversion unit.

4. The method of claim 1, further comprising fitting said measuring pixel values for dark pixels with an analytical function of wait time between said simultaneous transferring of electrical charges and said sensing of said electrical charges.

5. The method of claim 1, wherein said dark pixels are located in dark pixel rows interspersed among said array of pixel sensor cells.

6. The method of claim 1, wherein said dark pixels are located in an array of dark pixel rows and dark pixel columns interspersed among said array of pixel sensor cells, wherein said wait-time-dependent background signal values comprises an interpolated time-dependent map spanning said array of pixel sensor cells, and wherein said corresponding wait-time-dependent background signal value is interpolated from said interpolated time-dependent map.

7. The method of claim 1, wherein said light conversion unit is a photosensitive diode, and wherein said pixel sensor cells are complementary metal oxide semiconductor (CMOS) image sensor cells.

8. A method of operating an array of pixel sensor cells comprising:

exposing an entirety of an array of pixel sensor cells, wherein each of said pixel sensor cells contains a light conversion unit and a floating drain;

simultaneously transferring electrical charges from said light conversion unit to said floating drain in each of said array of pixel sensor cells;

sensing said electrical charges in said floating drains one row at a time and for each row in said array to generate raw pixel values for each pixel sensor cell;

measuring pixel values for dark pixels and generating wait-time-dependent background signal values for said array of pixel sensor cells; and generating a set of noise-compensated pixel values by subtracting a corresponding wait-time-dependent background signal value from each of said raw pixel values, wherein said dark pixels are located in an array of dark pixel rows and dark pixel columns interspersed among said array of pixel sensor cells, wherein said wait-time-dependent background signal values comprises an interpolated time-dependent map spanning said array of pixel sensor cells, and wherein said corresponding wait-time-dependent background signal value is interpolated from said interpolated time-dependent map.

* * * * *